US007424444B1

(12) United States Patent
Condon et al.

(10) Patent No.: US 7,424,444 B1
(45) Date of Patent: Sep. 9, 2008

(54) APPARATUS AND METHOD FOR CONFIGURING COMPUTERS

(75) Inventors: Pat Condon, Cork (IE); Mike Finucane, Kerry (IE); Maurice Hayes, Limerick (IE); Patrick O'Grady, Clare (IE); Paul Reid, Limerick (IE); David Speight, Cork (IE); John White, Dublin (IE)

(73) Assignee: Dell USA, L.P., Round Rock, TX (US)

( * ) Notice: Subject to any disclaimer, the term of this patent is extended or adjusted under 35 U.S.C. 154(b) by 530 days.

(21) Appl. No.: 09/467,706

(22) Filed: Dec. 20, 1999

(51) Int. Cl.
*G06Q 30/00* (2006.01)
*G06F 13/00* (2006.01)

(52) U.S. Cl. .................. 705/26; 717/174; 710/104
(58) Field of Classification Search .......... 715/26, 715/27; 717/174; 713/1; 700/115, 97; 705/1, 705/7, 26, 27, 10
See application file for complete search history.

(56) References Cited

U.S. PATENT DOCUMENTS

| 4,389,706 A | 6/1983 | Gomola et al. ............. 700/1 |
| 4,589,063 A | 5/1986 | Shah et al. ................ 710/8 |
| 4,870,591 A | 9/1989 | Cicciarelli et al. ......... 700/107 |
| 4,984,155 A | 1/1991 | Geier et al. ............... 705/26 |
| 5,003,472 A | 3/1991 | Perrill et al. ............... 705/15 |
| 5,113,518 A | 5/1992 | Durst, Jr. et al. .......... 395/550 |
| 5,230,052 A | 7/1993 | Dayan et al. .............. 395/700 |
| 5,257,387 A | 10/1993 | Richek et al. ............. 713/600 |
| 5,263,164 A | 11/1993 | Kannady et al. |
| 5,325,532 A | 6/1994 | Crosswy et al. ........... 395/700 |
| 5,367,686 A | 11/1994 | Fisher et al. |
| 5,371,792 A | 12/1994 | Asai et al. ................. 380/3 |
| 5,416,842 A | 5/1995 | Aziz ........................ 380/30 |
| 5,418,918 A | 5/1995 | Vander Kamp et al. .... 395/375 |
| 5,459,867 A | 10/1995 | Adams et al. ............. 395/700 |
| 5,504,904 A | 4/1996 | Dayan et al. .............. 395/700 |
| 5,517,494 A | 5/1996 | Green .................... 370/60 |

(Continued)

FOREIGN PATENT DOCUMENTS

GB    2 234 097 A    1/1991

(Continued)

OTHER PUBLICATIONS

Dinitz, "Rules-Based System Performs Best in Configure-to-Order" Industrial Engineering, v. 23, n.2, p. 20(2), Feb. 1991.*

(Continued)

*Primary Examiner*—Yehdega Retta
(74) *Attorney, Agent, or Firm*—Haynes and Boone, LLP

(57) ABSTRACT

A method and apparatus for automatically manufacturing a computer. An order is received from a customer. A manufacturing plant assembles together the hardware and software components from stores specified by the order, and loads the software packages onto the computer. A Web page is provided for the customer to specify any software modifications required. Those modifications are recorded as auto-modification files. The auto-modification files and the order details are checked against each other and the manufacturer's current capabilities for consistency by a validation unit. Each auto-modification file in turn is called by the manufacturing control unit, which determines the configuration data corresponding thereto and enters that configuration data into the computer as the software packages are being loaded.

8 Claims, 2 Drawing Sheets

U.S. PATENT DOCUMENTS

| | | | | |
|---|---|---|---|---|
| 5,526,489 | A | 6/1996 | Nilakantan et al. | 395/200.02 |
| 5,535,276 | A | 7/1996 | Ganesan | 380/25 |
| 5,541,927 | A | 7/1996 | Kristol et al. | 370/94.2 |
| 5,544,040 | A | 8/1996 | Gerbaulet | 705/26 |
| 5,570,291 | A | 10/1996 | Dudle et al. | 700/95 |
| 5,570,292 | A | 10/1996 | Abraham et al. | 364/473.01 |
| 5,598,536 | A | 1/1997 | Slaughter, III et al. | 395/200.14 |
| 5,608,900 | A | 3/1997 | Dockter et al. | 395/613 |
| 5,613,012 | A | 3/1997 | Hoffman et al. | 382/115 |
| 5,640,193 | A | 6/1997 | Wellner | 348/7 |
| 5,665,951 | A | 9/1997 | Newman et al. | 235/375 |
| 5,708,798 | A | 1/1998 | Lynch et al. | 395/500.01 |
| 5,765,137 | A * | 6/1998 | Lee | 705/7 |
| 5,808,894 | A | 9/1998 | Wiens et al. | 364/479.01 |
| 5,844,554 | A | 12/1998 | Geller et al. | 345/333 |
| 5,894,571 | A | 4/1999 | O'Connor | |
| 5,953,533 | A | 9/1999 | Fink et al. | |
| 5,963,743 | A | 10/1999 | Amberg et al. | 395/712 |
| 5,991,543 | A | 11/1999 | Amberg et al. | 395/712 |
| 5,995,757 | A | 11/1999 | Amberg et al. | 395/712 |
| 6,003,012 | A * | 12/1999 | Nick | 705/10 |
| 6,052,669 | A * | 4/2000 | Smith et al. | 705/26 |
| 6,080,207 | A * | 6/2000 | Kroening et al. | 717/11 |
| 6,092,189 | A | 7/2000 | Fisher et al. | |
| 6,178,546 | B1 * | 1/2001 | McIntyre | 717/115 |
| 6,182,897 | B1 * | 2/2001 | Knowles et al. | 235/462.01 |
| 6,466,836 | B1 * | 10/2002 | Astarabadi | 700/115 |
| 6,490,493 | B1 * | 12/2002 | Dharnipragada | 700/97 |
| 6,609,108 | B1 * | 8/2003 | Pulliam et al. | 705/27 |

FOREIGN PATENT DOCUMENTS

| | | | |
|---|---|---|---|
| GB | 2 264 797 A | | 9/1993 |
| GB | 2 301 206 A | | 11/1996 |
| GB | 2 329 052 A | | 3/1999 |
| WO | WO 98/10360 | | 3/1998 |
| WO | WO 00/28414 | | 5/2000 |

OTHER PUBLICATIONS

Printed material from http://uk.gateway.com/home/desktop/hometopfrm.htm.

Doug Bartholomew, "Trawling for $1 billion", Industry Week, vol. 246, issue 8, pp. 68-71.

Anne Knowles, "Find out what your customer really want", Datamation, vol. 43, issue 2, pp. 68-72.

John Teresko, "Calico Technology: Concinity configuration/quotation system", Industry Week, vol. 245, issue 23, pp. 24-26.

Manson, Keith Antar, Calico: Calico Announces initial public offering, M2 Presswire, Coventry, Oct. 12, 1999, p. 1.

http://www.calicotech.com/produces, 1999 Calico Commerce, Inc.

Gateway 2000, Inc. (Hardest Site To Work Through), Computerworld, v31, n46, p. 108, Nov. 1997.

http://corporate.pcorder.com/corpinfo/pressReleases/showRelease.asp?PR_ID-11, "Compucom and PcOrder.com partner to provide state-of-the-art electronic commerce solution", Jun. 3, 1997.

http://corporate.pcorder.com/corpinfo/pressReleases/showRelease.asp?PR_ID=5, "New company, PcOrder.com, creates first industry-wide electronic commerce system to transform PC sales process", Jun. 17, 1996.

http://corporate.pcorder.com/corpinfo/pressReleases/showRelease.asp?PR_ID=25, "PcOrder.com releases version 2.0 of PcOrder Online, the electronic commerce sales tool for resellers", Nov. 18, 1996.

http://www.dell.com/us/en/gen/corporate/press/pressoffice us 1998-05-21-rr-000.htm, "Dell relaunches E-Commerce Site with New Features", May 21, 1998.

http://www.zdnet.com/sr/breaking/980223/980224g.html, "Microsoft To Walk A Fine Line With Online Shopping", Mary Jo Foley, Feb. 24, 1998.

Computer Record accession No. 02210346 & PC Week, v15, n33, p. 69, Aug. 17, 1998, "Netting Big Ticket Sales On the Web", Stephanie Neil.

Computer Record accession No. 02168314 & PC Week, v15, n10, p. 1, Mar. 9, 1998, "Oracle's ICS Sets Up Electronic Shop-Fast", Timothy Dyck.

* cited by examiner

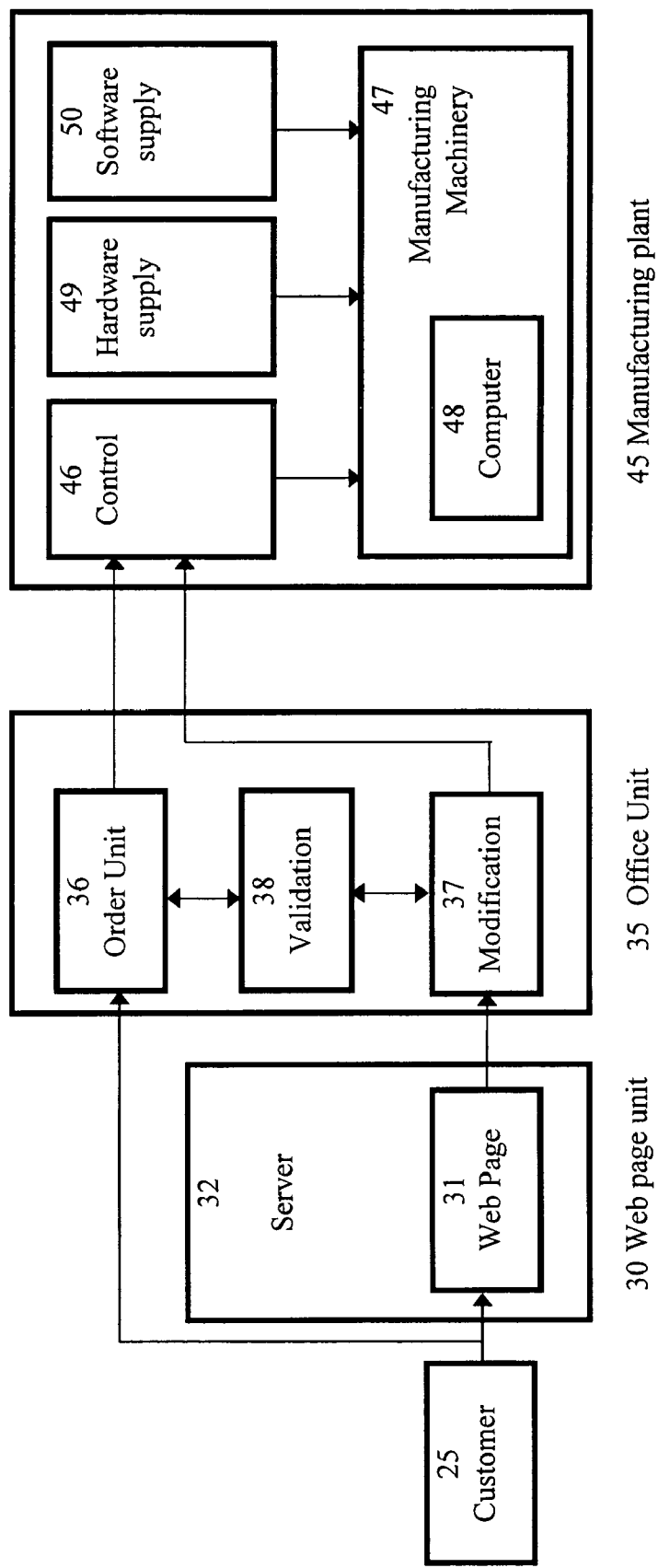

APPARATUS AND METHOD FOR CONFIGURING COMPUTERS

BACKGROUND

The disclosures herein relate to computers, and more specifically to configuring computers to meet customers build-to-order requirements.

This application relates to U.S. patent application Ser. No. 08/514,649, filed on Aug. 14, 1995, now U.S. Pat. No. 5,894,571, issued Apr. 13, 1999, entitled PROCESS FOR CONFIGURING SOFTWARE IN A BUILD-TO-ORDER COMPUTER SYSTEM, naming Clint H. O'Conner as inventor; U.S. patent application Ser. No. 09/012,962, filed on Jan. 26, 1998, now U.S. Pat. No. 6,182,275, issued Jan. 30, 2001, entitled GENERATION OF A COMPATIBLE ORDER FOR A COMPUTER SYSTEM, naming Alan E. Beelitz and Paul J. Maia, as inventors; and U.S. patent application Ser. No. 09/158,564, filed on Sep. 22, 1998, now U.S. Pat. No. 6,167,383, issued Dec. 26, 2000, entitled METHOD AND APPARATUS FOR PROVIDING CUSTOMER CONFIGURED MACHINES AT AN INTERNET SITE, naming Ken Henson as inventor. The above-listed issued patents are incorporated herein by reference in their entirety, and assigned to the assignee of the present invention.

A computer manufacturer will typically be prepared to supply customers with virtually any combination of hardware and software which a customer may require. The combination of hardware units which the customer requires will obviously have to be physically assembled together. The combination of software systems must also obviously be assembled together and then loaded onto the hardware.

Both hardware and software units frequently offer many options. For hardware, the appropriate choices for the various options for the different units obviously have to be made when the units are being selected and assembled. For software, the options essentially involve selecting and loading the appropriate modules.

The customer generally has a wide choice of hardware units, depending on their particular needs. The types of hardware units range from specialized ones, such as drafting units, to those which are near-universal, such as Visual Display Units (VDU's) and printers. For each of these units, there is a wide variety of different types. The one true universal unit is the central processor, without which, no other unit can usefully run.

Similarly, the customer generally has a wide choice of software packages, depending on their particular needs. The types of software packages range from specialized ones such as special-purpose statistics packages and 3 dimensional CAD/CAM packages to those which are near-universal, such as word processing packages (it is a rare computer which does not have at least some basic word-processing capability). Again, for each of these units, there is a wide variety of different types. The one true universal package is the operating system, without which, no application packages can run.

With hardware, there are broadly two types of options. Some options are true hardware options, e.g., which type of drive or modem should be included in the system. Others are settable, typically involving the setting of an array of small switches, for example as used on a printer. The manufacturer is obviously responsible for ensuring that the desired set of hardware features is included in each hardware unit supplied. However, the correct setting of the settable features is normally left to the customer. The setting of peripheral units such as printers is normally regarded as relatively simple. The customer will often not be in a position to make an informed choice of the settings until they have read and digested the operating instructions for the unit. Many types of units are bought in by the manufacturer, who may therefore have limited knowledge and expertise concerning them.

Turning to software, many software modules or packages incorporate a wide variety of options. It is normally the responsibility of the customer to select the appropriate options, typically on installing the software package, but often to some extent during use of the package. When a software package is "opened", i.e. selected to run on the computer, the various options can usually be selected for setting or adjustment. In practice, major settings are likely to be made during installation, and minor ones during the first few times the program is run (though generally the options can be changed at any time if desired).

In a sense, by far the most important software package in any conventional computer is the operating system. It is fundamental in the sense that without it, none of the application packages will run. An operating system is normally permanently installed, and runs automatically whenever the computer is switched on (rather than having to be started up or "opened" like application software). Parts of the operating system may be resident in ROM rather than RAM, and many of the more basic of the operating system options may be set permanently by being "burned in" during their installation.

Operating systems have evolved to incorporate a large number of functions which in earlier days were performed by application programs, and this process is continuing. As a result, the number of options selectable in an operating system is becoming very large, and their complexity is also becoming very high.

It is realized that many of the most important settings of the operating system are concerned with functions which affect the operation and efficiency of the computer system. To select such settings properly, considerable acquaintance with the nature and details of the computer system is required. These settings affect what may be termed the internal workings of the system. This is in contrast to the settings required in typical applications programs, which are in general much more readily appreciated by the user and the effects of which are in general much more readily apparent in the behavior of the program.

Therefore, what is needed is to provide a technique for making software settings of a computer system, and more particularly to provide a technique which is applicable to the settings required for operating systems.

SUMMARY

One embodiment, accordingly, provides a method of automatically manufacturing a computer. To this end, an order is received from a customer. The hardware components specified by the order are assembled together. The software packages specified by the order are loaded onto the computer. An Internet-accessible page is provided for the customer to specify any software modifications required. Those modifications are recorded as an auto-configuration file. For each modification in the auto-configuration file, the configuration data corresponding thereto is determined and entered into the computer as the software packages are being loaded.

A principal advantage of this embodiment is that it provides for automatically configuring a computer in accordance with customer requirements. This reduces or avoids the need for manual configuration, with its attendant problems of cost and the possibility of error.

BRIEF DESCRIPTION OF THE DRAWINGS

FIG. 2 is a general block diagram illustrating an embodiment of the hardware units involved in the process.

DETAILED DESCRIPTION

Figure 1:
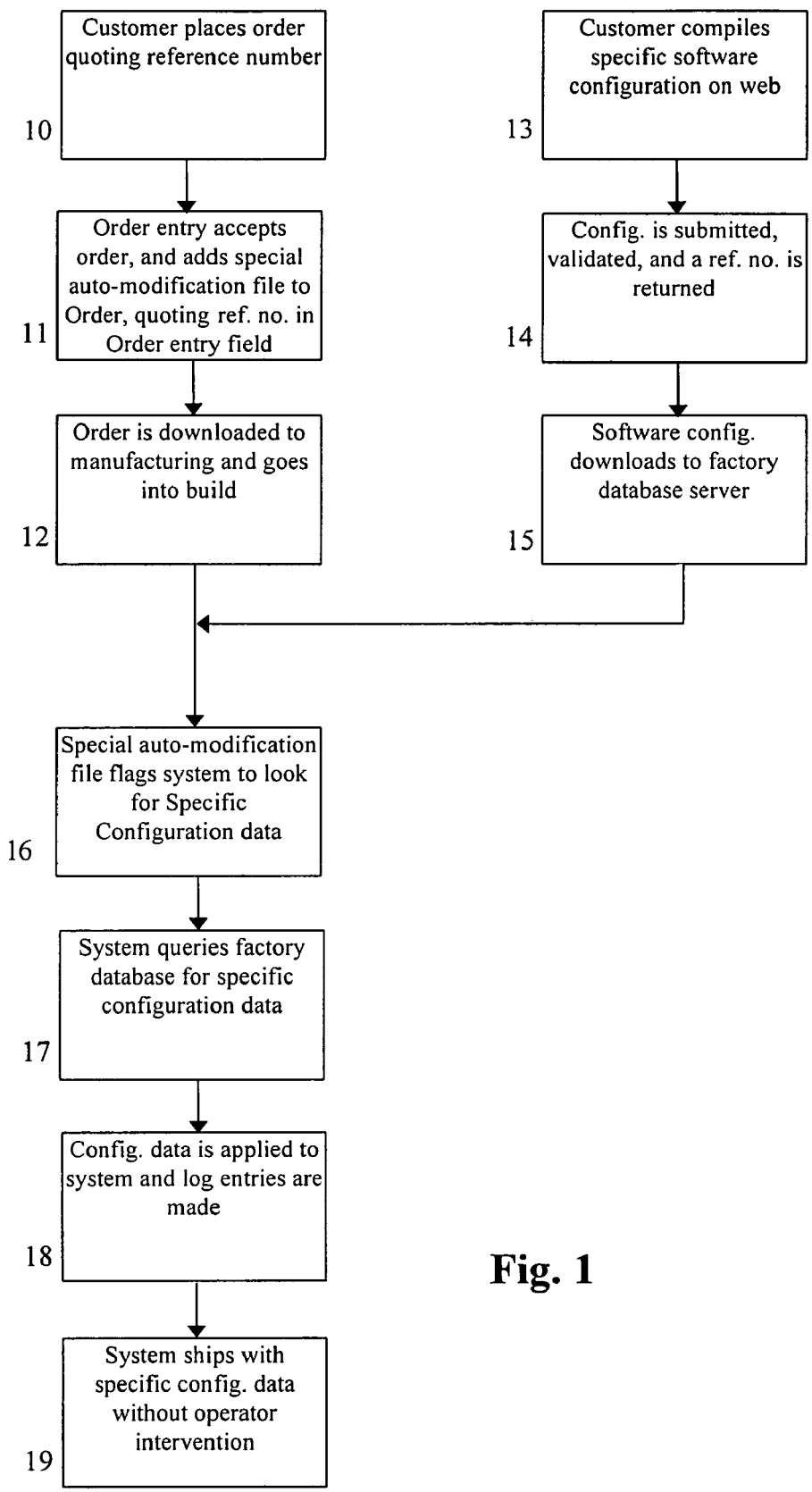
FIG. 1 is a simplified general flow diagram illustrating an embodiment of the present process.

The general sequence of operations in the present system is shown in FIG. 1. The standard procedure for a customer to obtain a computer system is indicated in blocks 10 to 13. In block 10, the customer places an order, and a reference number for the order is generated. In block 11, the manufacturer's order entry system accepts the order. In block 12, the order is down-loaded to the manufacturing plant and the system goes into a build mode. Also, if any special configuration is required for this order, an auto-configuration indicator is included in the order.

If there are any special configuration requirements, these are processed as shown by blocks 13 to 15. The process of these blocks occurs essentially in parallel with the standard procedures of blocks 10 to 12, though blocks 13 to 15 can of course be included at any convenient points in the sequence of blocks 10 to 12 if desired.

In block 13, the customer compiles the specific configuration information required, and passes this to the manufacturer over the Internet. More specifically, the manufacturer makes a Web page available to the customer for this purpose. In block 14, the configuration is submitted to the manufacturer. The manufacturer passes the information to a validation system which checks the modifications to verify that they are consistent with each other and within the range of modifications which the manufacturer can implement. In block 16, the desired software configuration is down-loaded to the database server of the manufacturing plant.

Blocks 16 to 19 show the manufacturing process in more detail for orders which involve modifications. In block 16, a special modifications indicator in the order, flags the system to look for specific configuration data. The system then (block 17) queries the factory database for the specific configuration data (this data was passed to the factory database server in block 15). In block 18, the configuration data is applied to the system being manufactured, and that fact is logged in a manufacturing log record. In block 19, the completed system is shipped to the customer. The system as shipped thus includes the specific configuration data required, and has been manufactured without requiring operator intervention to achieve that configuration.

FIG. 2 is a general block diagram showing the various units involved in this process. The main units involved are the customer 25, a Web page unit 30, the manufacturer's office unit 35, and the manufacturing plant 45. The office unit 35 and plant 45 are of course both part of the manufacturer's organization. The web page unit 30 supports a web page 31, which is also effectively a part of the manufacturer's organization. Physically, the web page 31 has to be supported on a web server unit 32. In principle, this could be operated and/or owned by a third party Internet Service Provider, but in practice it will normally also be a part of the manufacturer's organization.

The normal purchase process involves the customer 25 sending an order to an order unit 36 in the office unit 35 (blocks 10 and 11 of FIG. 1). In principle, this may be a paper exercise between the customer and the manufacturer, with the relevant data, both technical and commercial (price, delivery arrangements, etc.) being entered into the order unit 36 by the manufacturer. It may however be convenient for the relevant information to be passed from the customer to the manufacturer in digital form, e.g. over the Internet. This may in fact involve the use of a Web page, but it must be noted that this process is essentially independent of the automated configuration process described below.

Once the order has been placed, the technical elements of the order are passed (block 12) to a control unit 46 in the manufacturing plant, which controls manufacturing machinery 47, which manufactures and assembles the computer 48. Various supply lines 49, 50, etc., contain hardware units and software packages, respectively. The appropriate hardware units are selected from the supply line 49 for assembly together to form the computer 48, and the appropriate software packages are selected from the supply line 50 and loaded onto the computer 48.

If the customer wants the computer to be given a special configuration, i.e., a configuration which differs from the standard default configuration, then the customer communicates with the Web page 31 and enters the details of the desired configuration in that page (block 13). The Web page may of course include guidance and advice to assist the customer to make their choices and to understand the significance of those choices. In addition, the customer must include, in the main order which is passed to the order unit 36, an indication that a special configuration is desired for the computer being ordered.

Once the desired configuration has been specified on the Web page 31, the page is passed to a modification unit 37 in the office unit 35. The configuration details in the modification unit are then passed to a validation unit 38, which is also fed with the details of the order from the order unit 36. The validation unit 38 checks for consistency between the order details and the configuration details. The validation unit is also supplied with general information about the current capabilities of the manufacturer, and checks those details for compatibility with the order details and configuration details (block 14).

Once the configuration details have been validated, they are made available to the control unit 46 in the manufacturing plant. This control unit detects any modification flag in the order details coming from the order unit 36 (block 16) and obtains the corresponding configuration details from the unit 37. Next, the control unit checks those details with the factory database to determine how to implement them (block 17). The control unit then enters the appropriate data into the computer 48 being manufactured (block 18). This will normally involve entering the details in the appropriate ones of the software packages which are being or have been loaded from the software supply line 50. The completed computer is then shipped to the customer (block 19).

In summary, the preferred embodiment provides a method of automatically manufacturing a computer 48. An order is received at 36 from a customer 25. Manufacturing plant 47 assembles together the hardware and software components from supply lines or stores 49, 50, etc., specified by the order, and loads the software packages onto the computer. A Web page 31 is provided for the customer to specify any software modifications required. Those modifications are recorded at 37 as an auto-modification file. The modifications and the order details are checked against each other and the manufacturer's current capabilities for consistency by a validation unit 38. Each modification in turn is called by the manufacturing control unit 46, which determines the configuration data corresponding thereto and enters that configuration data into the computer as the software packages are being loaded.

Although illustrative embodiments have been shown and described, a wide range of modification, change and substitution is contemplated in the foregoing disclosure and in some instances, some features of the embodiments may be employed without a corresponding use of the other features. Accordingly, it is appropriate that the appended claims be construed broadly and in a manner consistent with the scope of the embodiments disclosed herein.

What is claimed is:

1. A method of automatically manufacturing a computer comprising:
   a manufacturer providing a manufacturer web page unit, a manufacturer office unit and a manufacturer plant;
   a customer sending a main order for the computer to the office unit via a web page in the web page unit, the customer being required to indicate if a special configuration is desired;
   passing elements of the main order to a control unit in the manufacturing plant unit;
   the control unit controlling manufacturing and supply lines containing a plurality of compatible hardware and selected software components for installation into the computer being manufactured;
   the customer entering any special configuration details to the web page unit;
   passing the web page to a modification unit in the office unit;
   passing the special configuration details to a validation unit in the office unit;
   the validation unit checking the special configuration details for compatibility with details of the main order;
   upon validation, sending the special configuration details to the control unit;
   the control unit detecting any modification details in the main order details and obtaining corresponding configuration details from the modification unit;
   the control unit checking the configuration details with a factory database for implementation; and
   the control unit entering appropriate data into the computer being manufactured including entering modification details in appropriate ones of the selected software components which are being installed or have been installed in the computer.

2. The method according to claim 1, further comprising logging the modification details as they are made.

3. The method according to claim 1, further comprising generating an order reference number.

4. The method according to claim 1, further comprising accepting the order.

5. The method according to claim 1, further comprising processing the special configuration in parallel with the main order.

6. The method according to claim 1, further comprising logging the special configuration into a manufacturing log.

7. The method according to claim 1, further comprising shipping the order to the customer.

8. The method according to claim 1, further comprising verifying each modification detail against current manufacturing capabilities.

* * * * *